United States Patent [19]

Urakami

[11] Patent Number: 4,954,893
[45] Date of Patent: Sep. 4, 1990

[54] REFERENCE SIGNAL PRODUCING CIRCUIT FOR PHASE SERVO CONTROL

[75] Inventor: Toyozo Urakami, Hyogo, Japan

[73] Assignee: Sanyo Electric Co., Ltd., Moriguchi, Japan

[21] Appl. No.: 404,015

[22] Filed: Sep. 7, 1989

[30] Foreign Application Priority Data

Sep. 7, 1988 [JP] Japan .................. 63-224037
Jan. 31, 1989 [JP] Japan .................. 64-22941

[51] Int. Cl.⁵ .................... H04N 5/04; H04N 5/10
[52] U.S. Cl. .................... 358/148; 358/150; 358/153; 358/154
[58] Field of Search .............. 358/148, 150, 153, 154, 358/158

[56] References Cited

U.S. PATENT DOCUMENTS

| | | | |
|---|---|---|---|
| 4,556,905 | 12/1985 | Ikejiri | 358/154 |
| 4,675,734 | 6/1987 | Widom | 358/154 |
| 4,769,704 | 9/1988 | Harai et al. | 358/148 |
| 4,897,723 | 1/1990 | Arai | 358/148 |

FOREIGN PATENT DOCUMENTS

61-288574 12/1986 Japan .

Primary Examiner—John W. Shepperd
Assistant Examiner—Michael D. Parker
Attorney, Agent, or Firm—Armstrong, Nikaido, Marmelstein, Kubovcik & Murray

[57] ABSTRACT

This reference signal producing circuit includes circuits (3, 5) for separating a vertical synchronizing signal from a composite synchronizing signal, a timer (25) reset by a reference signal, a circuit (26) for comparing an output of the timer with a variable set value and producing a compensation signal having a variable period, and a reference signal output circuit (23) for supplying as a reference signal the separated vertical synchronizing signal or the compensation signal. Although the period of the compensation signal is usually set to a value slightly larger than that of a vertical synchronizing signal period, it is set to a value equal to the vertical synchronizing signal period in the case that the vertical synchronizing signal pulses within the composite synchronizing signal lack successively.

16 Claims, 9 Drawing Sheets

FIG.4(a) COMPOSITE SYNCHRONIZING SIGNAL

FIG.4(b) COUNTER 3

FIG.4(c) OCRVD OUTPUT

FIG.8(a) VERTICAL SYNC SIGNAL

FIG.8(b) VERTICAL SYNC SIGNAL AFTER COMPENSATION

FIG.8(c) VERTICAL COMPENSATION DETECTION

FIG.5(a) VERTICAL SYNC SIGNAL 
FIG.5(b) MASK PERIOD 
FIG.5(c) OR GATE 23 OUTPUT 
FIG.5(d) OCRV 29 OUTPUT 
FIG.5(e) OCRV 28 OUTPUT

FIG.6(a) VERTICAL SYNC SIGNAL 
FIG.6(b) MASK PERIOD 
FIG.6(c) OCRV 26 OUTPUT 
FIG.6(d) AND GATE 22 OUTPUT 
FIG.6(e) OCRV 28 OUTPUT 
FIG.6(f) FF 33 OUTPUT 
FIG.6(g) V_INL 
FIG.6(h) REF 60

REFERENCE SIGNAL PRODUCING CIRCUIT FOR PHASE SERVO CONTROL

BACKGROUND OF THE INVENTION

1. Field of the Invention

The present invention relates generally to reference signal producing circuits, and more particularly to improvements in the reference signal producing circuit for producing a reference signal for phase servo in synchronization with an external signal such as a composite synchronizing signal in a motor servo circuit of a video apparatus such as a video tape recorder (hereinafter referred to as a VTR).

2. Description of the Background Art

Conventionally, there is provided a motor servo circuit for controlling rotation of a cylinder motor and a capstan motor in a VTR. In such a motor servo circuit, a reference signal for controlling phase servo of the motor is produced based on a composite synchronizing signal extracted from a video signal. This production of the reference signal is in general carried out by employing a synchronization separator circuit for separating a vertical synchronizing signal from the composite synchronizing signal. As an example of this synchronization separator circuit, a circuit is proposed and also disclosed in Japanese Patent Laying-Open No. 61-288574, which includes an up/down counter and thus controls counting operation of this counter in accordance with the level of the composite synchronizing signal to sense the vertical synchronizing signal depending on an output state of this counter.

Furthermore, this synchronization separator circuit carries out separation of a horizontal synchronizing signal for special reproduction in the VTR, which will be described later.

As another example of the conventional synchronization separator circuit, a circuit is proposed which has a compensating function in the case of incidental one-shot lack of pulses of the vertical synchronizing signal and the horizontal synchronizing signal within the composite synchronizing signal.

However, no circuit has the compensating function in the case of successive lack of the plurality of horizontal synchronizing signal pulses or vertical synchronizing signal pulses within the composite synchronizing signal. Therefore, various problems arise as follows in the case of the successive lack.

In the case of changing channels during picture recording in the VTR, for example, supply of the video signal is generally interrupted to lose the vertical synchronizing signal and thus synchronization reference for motor servo. Furthermore, in the case of only recording a sound in a high fidelity video or the like, or in the case of being unable to sense the vertical synchronizing signal because of an extremely weak broadcasting signal, the vertical synchronizing signal pulses lack successively, thereby not obtaining the synchronization reference for phase servo of various types of motors.

In addition, the following problem occurs in the special recording in the VTR, in the case that the horizontal synchronizing signal pulses in the composite synchronizing signal successively lack from the above described causes. That is, in the special reproduction in the VTR, V jitter (very fine movement of vertical sync) on a screen is prevented by employing a quasi vertical synchronizing signal in which the plurality of horizontal synchronizing signal pulses are inserted immediately before the vertical synchronizing signal pulse; however, the V jitter cannot be prevented when the horizontal synchronizing signal pulses in the composite synchronizing signal lack successively.

SUMMARY OF THE INVENTION

It is an object of the present invention to provide a reference signal producing circuit having a reference signal producing function in the case of successive lack of vertical synchronizing signal within a composite synchronizing signal.

It is another object of the present invention to provide a reference signal producing circuit capable of supplying a reference signal having a period equal to that of the vertical synchronizing signal and performing stable phase servo control, in the case of the successive lack of the vertical synchronizing signal pulses in the composite synchronizing signal.

It is a further object of the present invention to provide a reference signal producing circuit capable of superior special reproduction even in the case of the successive lack of horizontal synchronizing signal pulses in the composite synchronizing signal.

In short, according to the present invention, a reference signal producing circuit for producing the reference signal based on the composite synchronizing signal externally supplied comprises a separator circuit for separating the synchronizing signal from the composite synchronizing signal, a timer circuit being reset by the reference signal, a compensation signal producing circuit for comparing an output of the timer circuit with a variable set value to produce a compensation synchronizing signal having a variable period, and a reference signal output circuit for supplying as the reference signal an output of the separator circuit or an output of the compensation signal producing circuit, the set value of the compensation signal producing circuit being changed such that a period of the compensation synchronizing signal is normally set to a slightly larger value than that of a synchronizing signal period, while being set to a value equal to that of the synchronizing signal period in the case that a predetermined number or more of the synchronizing signal pulses in the composite synchronizing signal lack successively.

According to another aspect of the present invention, the synchronizing signal separated from the composite synchronizing signal is a vertical synchronizing signal.

Therefore, it is a main advantage of the present invention that a stable phase servo control can be performed because the compensation synchronizing signal of a period equal to that of the original vertical synchronizing signal can be supplied in the case, as in no-video signal inputting, that a predetermined number or more of the vertical synchronizing signal pulses in the composite synchronizing signal lack successively.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
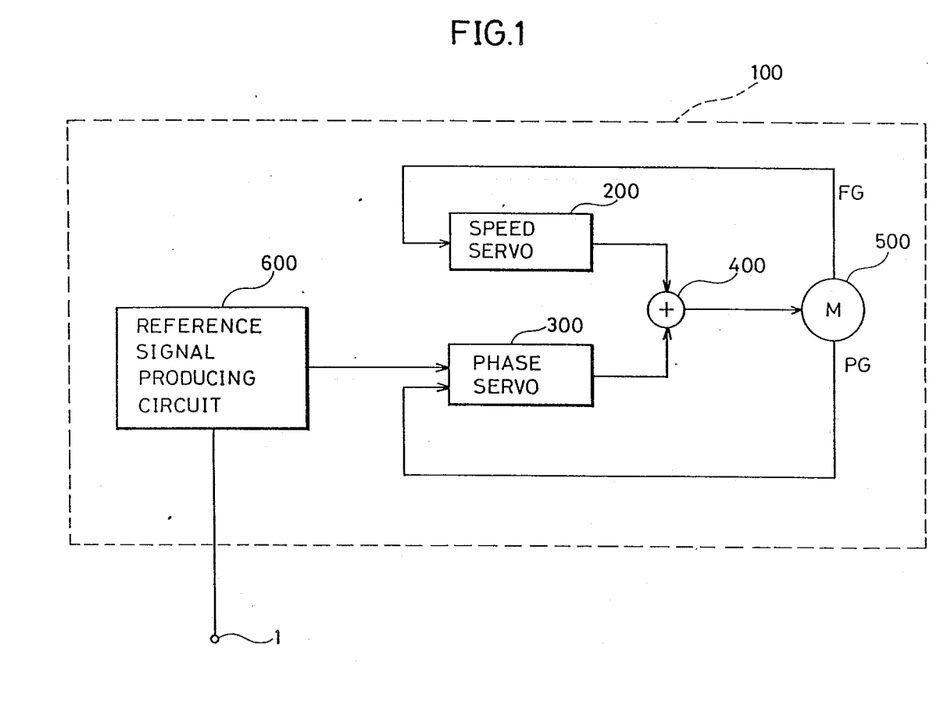
FIG. 1 is a schematic block diagram illustrating a motor servo circuit in a VTR employing a reference signal producing circuit according to the present invention.

FIG. 1 is a schematic block diagram of a motor servo circuit for controlling rotation of a cylinder motor in a VTR, employing a reference signal producing circuit, i.e., a synchronization separator circuit according to the present invention. The same motor servo circuit is further provided separately for controlling rotation of a capstan motor in the VTR.

As shown in FIG. 1, a motor servo circuit 100 includes a speed servo circuit 200 and a phase servo circuit 300. Control signals from these servo circuits 200 and 300 are added by an adder 400 and then applied to a motor circuit 500. FG pulses and PG pulses detected in the motor circuit 500 are fed back to the speed servo circuit 200 and the phase servo circuit 300, respectively. The motor servo circuit 100 also comprises a reference signal producing circuit (a synchronization separator circuit) 600 for generating a reference signal for the phase servo circuit 300 in response to a composite synchronizing signal inputted via an input terminal 1 from a video circuit which is not shown. Such speed and phase servo is usually realized on a software manner by a microcomputer, as described in, for example, Sanyo Technical Review Vol. 19 No. 2, 1987, pp. 18–24.

Next, a description will be given on a configuration of the reference signal producing circuit according to one embodiment of the present invention with reference to FIG. 2.

Figure 2:
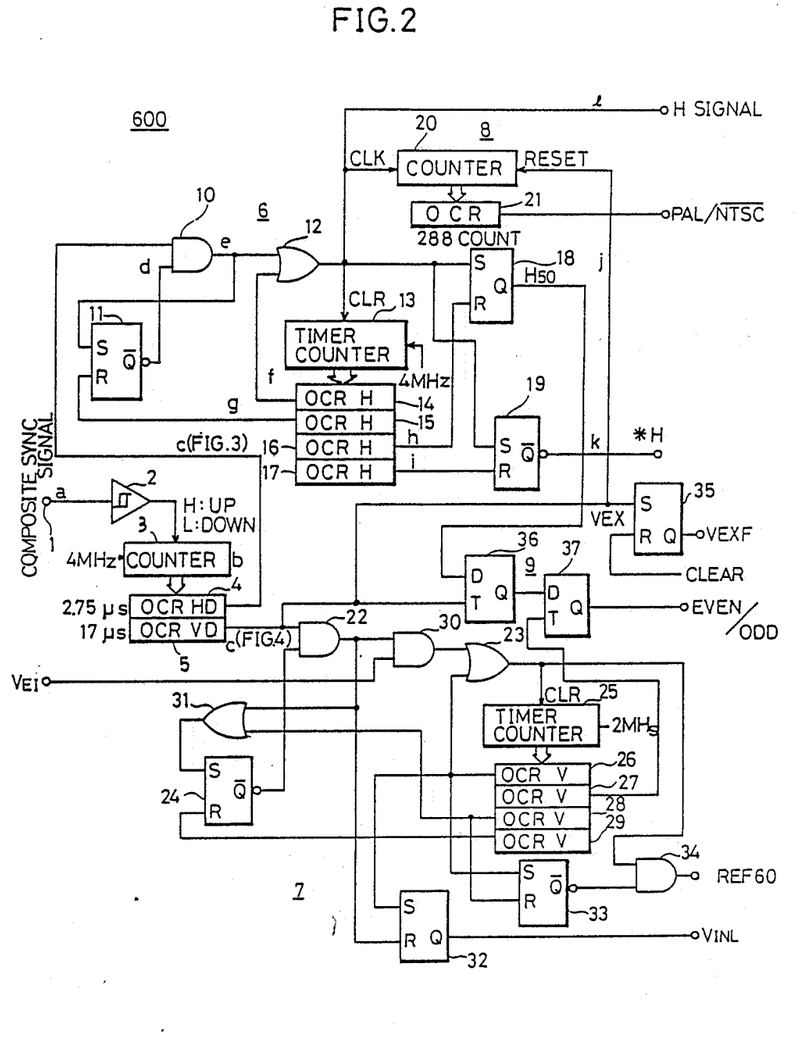
FIG. 2 is a block diagram illustrating a reference signal producing circuit according to one embodiment of the present invention.

As shown in FIG. 2, a composite synchronizing signal a inputted from the external video circuit via the input terminal 1 is applied to a counter 3 via a shaping amplifier 2. The counter 3, which performs up/down operation controlled depending on the level of the composite synchronizing signal outputted from the shaping amplifier 2, up-counts clock pulses of 4 MHz when the composite synchronizing signal is at the H level and down-counts the same at the L level.

Figures 3A, 3L:
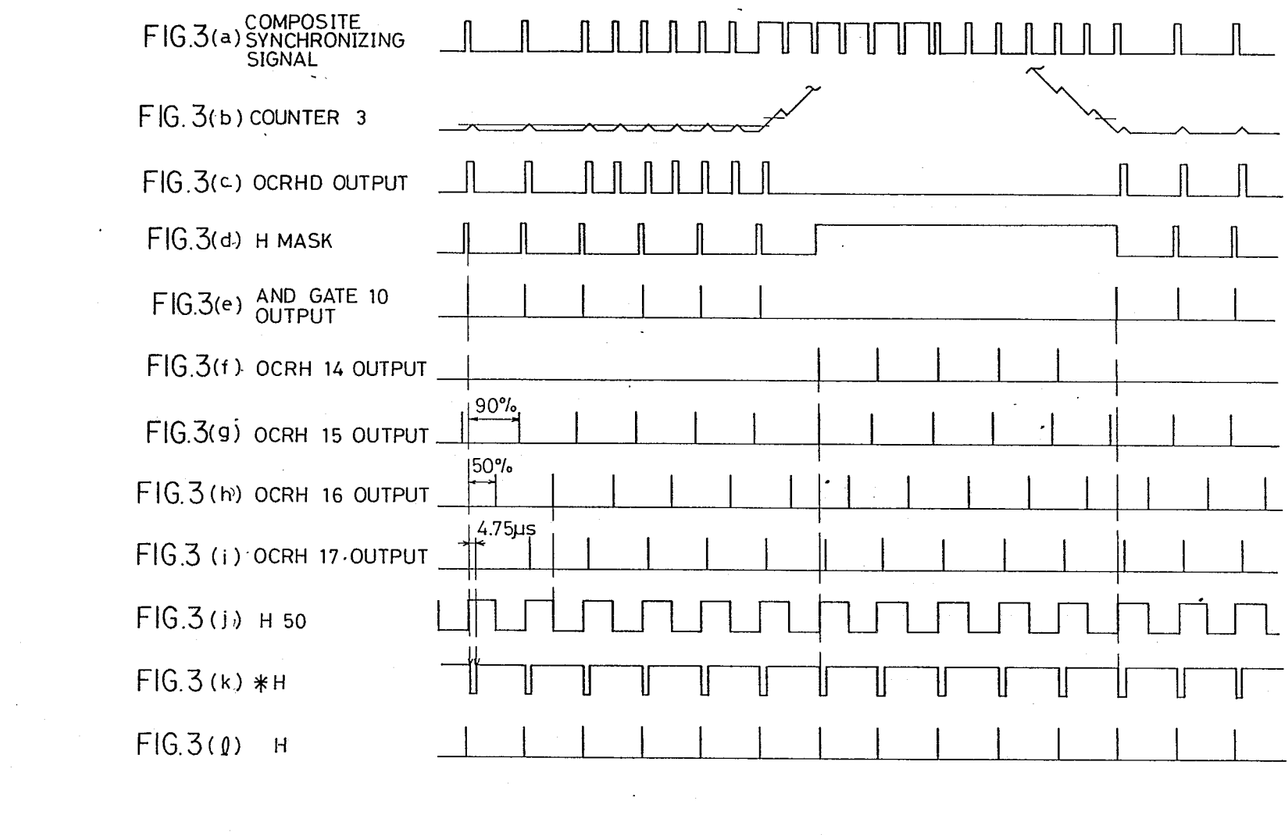
FIG. 3 is a timing chart for illustrating an operation of a horizontal processing block in the reference signal producing circuit shown in FIG. 2.
Figures 4A, 4B, 4C:
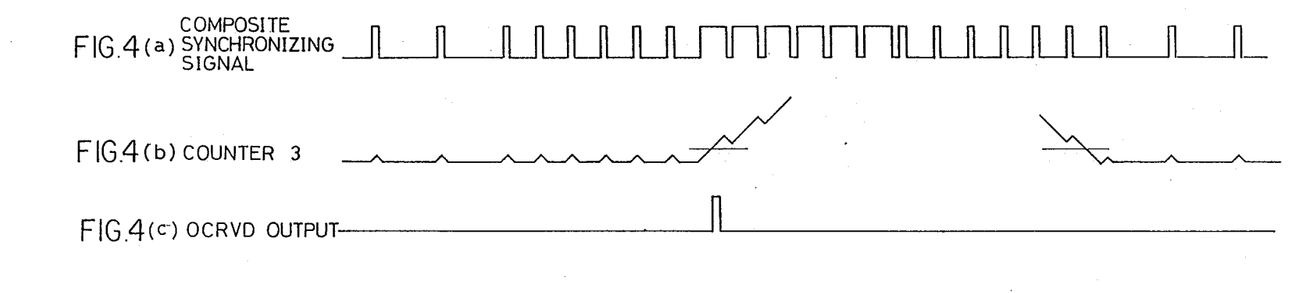
FIGS. 4–6 are timing charts for illustrating an operation of a vertical processing block in the reference signal producing circuit shown in FIG. 2.

A count value b of the counter 3 is applied to respective output compare registers OCRHD4 and OCRVD5 for horizontal detection and for vertical detection. Each of these output compare registers generates a pulse which is at the H level during a fixed period when its input exceeds its set value. In further detail, the OCRHD4 outputs a pulse at the H level when the count value from the counter 3 reaches a value corresponding to 2.75 $\mu$ sec, while the OCRVD5 outputs a pulse at the H level when the count value reaches a value corresponding to 17 $\mu$ sec. An output (FIG. 3(c)) from the OCRHD4 is applied to a horizontal processing block 6, and an output (FIG. 4(c)) from the OCRVD5 is applied to a vertical processing block 7. The reference signal producing circuit 600 further includes a PAL/NTSC decision block 8 and an even/odd number field decision block 9.

The horizontal processing block 6 comprises an AND gate 10, an RS-flip-flop 11 for HD mask, an OR gate 12, a horizontal timer counter 13 for counting clock pulses of 4 MHz and being reset by an output of the OR gate 12, horizontal output compare registers OCRH14, 15, 16 and 17, an H50 output RS-flip-flop 18 for outputting a horizontal synchronization period signal of 50% duty, and a *H output RS-flip-flop 19 for outputting a horizontal synchronization period signal having a pulse width of 4.75 $\mu$ sec employed as a quasi vertical synchronizing signal.

Each of the OCRH14, 15, 16 and 17 receives an output of the horizontal timer counter 13 to generate a pulse which attains the H level during a fix period when its input exceeds its set value. In more detail, the OCRH14 has a set value corresponding to 102% of a normal horizontal period; the OCRH15 has a set value corresponding to 90% of the normal horizontal period; the OCRH16 has a set value corresponding to 50% of the normal horizontal period; and the OCRH17 has a set value corresponding to a pulse width of a normal horizontal synchronizing signal.

An output of the OCRH 14 is supplied as a horizontal synchronizing signal for compensation to one input of the OR gate 12. An output of the OCRH15 resets the RS-flip-flop 11 for HD mask. An output of the OCRH16 resets the H50 output RS-flip-flop 18. An output of the OCRH17 resets the *H output RS-flip-flop 19. The AND gate 10 receives an output c from the OCRHD4 and a $\overline{Q}$ output of the RS-flip-flop 11 for HD mask to generate an output e and supply the same to the other input of the OR gate 12 and to a set input of the RS-flip-flop 11 for HD mask. The output of the OR gate 12 is outputted as an H signal l and also sets the H50 output RS-flip-flop 18 and the *H output RS-flip-flop 19.

Meanwhile, the vertical processing block 7 has a configuration similar to the above described horizontal processing block 6. That is, the vertical processing block 7 comprises an AND gate 22, an RS-flip-flop 24 for VD mask, an OR gate 23, a vertical timer counter 25 for counting clock pulses of 2 MHz and being reset by the output of the OR gate 23, vertical output compare registers OCRV26, 27, 28 and 29, which correspond to the AND gate 10, the RS-flip-flop 11 for HD mask, the OR gate 12, the horizontal timer counter 13, and the OCRH 14 to 17, respectively.

In addition to these elements, the vertical processing block 17 further comprises an AND gate 30 allowing an external input $V_{EI}$ to enter, an OR gate 31 for obtaining a set input of the RS-flip-flop 24 for VD mask, an RS-flip-flop 32 for VD compensation, an RS-flip-flop 33 for output forbidding, an AND gate 34, and an RS-flip-flop 35 for external VD detection.

Each of the OCRVs 26, 27, 28 and 29 receives an output of the vertical timer counter 25 to generate a pulse which attains the H level during a fixed period when its input exceeds its set value. In further detail, the OCRV26 has a set value corresponding to 102% of the normal vertical period. However, the set value is changed to a value corresponding to the normal vertical period in the case that the vertical synchronizing signal pulses lack over a long period of time, as will be described later. Moreover, a value for determining timing of even/odd number field decision, which will be described later, is set in the OCRV27. This timing is slightly delayed from the timing of an output of the AND gate 22. A value is set in the OCRV28, which determines a period to forbid inputting of a signal immediately after compensation of the vertical synchronizing signals. This set value is 5 m sec in an NTSC system and is 6 m sec in a PAL system. A value is set in the OCRV29, which determines a mask period (of 15 m sec in the NTSC system and of 18 m sec in the PAL system).

An output of the OCRV26 is supplied to one input of the OR gate 23, a set input of the RS-flip-flop 32 for detecting VD compensation, and to a set input of the RS-flip-flop 33 for output forbidding. An output of the OCRV27 is applied to the even/odd number fixed decision block 9. An output of the OCRV28 is applied to a reset input of the RS-flip-flop 33 for output forbidding and to one input of the OR gate 31. An output of the OCRV 29 is applied to a reset input of the RS-flip-flop 24 for VD mask. The AND gate 22 receives an output c (FIG. 4) from the OCRVD5 and a $\overline{Q}$ output of the RS-flip-flop 24 for VD mask to generate an output and apply the same to one input of the AND gate 30, a reset input of the RS-flip-flop 32 for VD compensation and to the other input of the OR gate 31. The other input of the AND gate 30 is supplied with an external signal $V_{EI}$, and an output of the AND gate 30 is applied to the other input of the OR gate 23. An output of the OR gate 31 is applied to a set input of the RS-flip-flop 24 for VD mask. The AND gate 34 receives an output of the OR gate 23 and a $\overline{Q}$ output of the RS-flip-flop 33 for output forbidding to generate a reference signal REF 60 and output the same.

The RS-flip-flop 35 for external VD detection has its set input supplied with an output of the OCRVD5 and its reset input supplied with a clear signal generated in a software manner by the microcomputer, which is not shown in the figure. An output of this flip-flop 35 is employed as an external VD detecting flag VEXF, which will be described later.

Meanwhile, the PAL/NTSC decision block 8, which decides that the video signal is provided in the PAL system or in the NTSC system, and informs the microcomputer of the result of this decision, is formed of a counter 20 for counting horizontal synchronizing signal pulses outputted from the OR gate 12 as clock pulses and being reset by the output of the OCRVD5, and a decision output compare register 21 for receiving an output thereof.

The even/odd number field decision block 9 formed of D-flip-flops 36 and 37 decides which field is the present field, and informs the microcomputer of the result of this decision in the case that either the even number filed or the odd number field is designated as a reference field for performing phase servo. The D-flip-flop 36 latches the level of a signal H50 with the output of the OCRVD5, and the D-flip-flop 37 latches a Q output of the D-flip-flop 36 with the output of the OCRV27. A Q output of the D-flip-flop 37 is supplied as a decision output.

Next, a description will be given on operation of the horizontal processing block 6 in the reference signal producing circuit shown in FIG. 2 with reference to the timing chart of FIG. 3.

First of all, when the composite synchronizing signal as shown in FIG. 3 (a) is inputted to the up/down counter 3 via the input terminal 1 and the shaping amplifier 2, the counter 3 performs up-counting and down-counting when the composite synchronizing signal is at the H level and at the L level, respectively, as shown in FIG. 3 (b).

When the count value of the counter 3 increases to reach the above described threshold value (which corresponds to 275 $\mu$ sec , the OCRHD4 generates a pulse of the H level having a fixed duration (see FIG. 3 (c)) and applies the same to one input of the AND gate 10. However, no pulse occurs when the count value decreases to reach the above described threshold value. The other input of the AND gate 10 is supplied with a mask signal from the RS-flip-flop 11 for HD mask, as shown in FIG. 3 (d). The RS-flip-flop 11 for HD mask is set by the output of the AND gate 10 (see FIG. 3 (e)) and is also reset by a signal (see FIG. 3 (g)) outputted from the OCRH15, having a threshold value corresponding to 90% of the normal horizontal period. Therefore, the mask signal d controls opening/closing of the AND gate 10 to accept a signal c only during the 10% period of the horizontal period. As a result, the AND gate 10 is closed during the remaining 90% period of the horizontal period, resulting in removal of noise components. An output e of the AND gate 10 is outputted as a horizontal synchronizing signal (an H signal) shown in FIG. 3 (l) and also applied to the horizontal timer counter 13 via the OR gate 12. Since the counter 13 is reset in the normal horizontal period in the case of no lack of pulses of the signal e, the output of the counter 13 does not reach a set value (which corresponds to 102% of the horizontal period) of the OCRH14, so that no pulses occur in the output of the OCRH14 (see FIG. 3 (f)) In the case of lack of the pulses of the signal e, however, the OCRH14 generates a compensation signal f to apply the same to the other input of the OR gate 12 at the time that the count value of the counter 13 reaches the set value of the OCRH14. Accordingly, the lack of the output e of the AND gate 10 is compensated, so that the compensated signal l is supplied as the H signal. In the case of successive lack of the pulses of the signal e, the counter 13 is reset by the output l of the OR gate 12, so that the output f of the OCRH14 is employed as the compensation signal.

Meanwhile, the H50 output RS-flip-flop 18 is set by the above described signal l, and reset by an output of the OCRH16 (see FIG. 3 (h)) having a set value corresponding to 50% of the horizontal period. Therefore, an output H50 thereof is illustrated as in FIG. 3 (j). This horizontal synchronizing signal j of 50% duty is applied to the even/odd number fixed decision block 9 for even-/odd number field decision, which will be described later.

Further, the *H output RS-flip-flop 19 is set by the above signal l, and reset by an output of the OCRH17 (see FIG. 3 (i)) having a set value corresponding to a pulse width of the normal horizontal synchronizing signal. Thus, an output *H thereof becomes a signal having a pulse width of 4.75 $\mu$ sec, as shown in FIG. 3 (k), to be employed as a horizontal period synchronizing signal in the special reproducing as described above.

A description will now be given on operation of the vertical processing block in the reference signal producing circuit shown in FIG. 2 with reference to the timing charts of FIGS. 4 through 6.

First of all, waveforms shown in FIGS. 4 (a) and (b) are identical to those of FIGS. 3 (a) and (b) in the foregoing. That is, FIG. 4 (b) represents the count value of the up/down counter 3. When this count value increases to reach the above described threshold value (which corresponds to 17 $\mu$ sec), the OCRVD5 generates a pulse of the H level having a fixed duration (see FIG. 4 (c)) and apply the same to one input of the AND gate 22. However, no pulses occur when the count value decreases to reach the above described threshold value. Thus, the horizontal synchronizing signal and the vertical synchronizing signal are separated by setting the threshold value of the OCRHD4 to 2.75 $\mu$ sec and that of the OCRVD5 to 17 $\mu$ sec. These threshold values may be set to 3.5 $\mu$ sec and 14 $\mu$ sec, respectively.

Figure 5A:
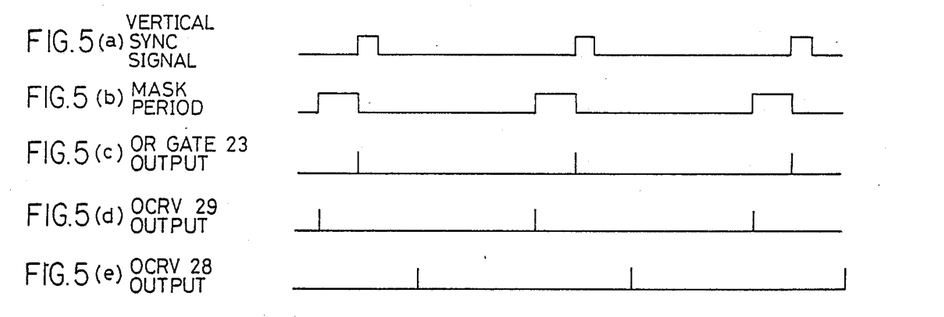

FIG. 5 is a timing chart for illustrating operation of the vertical processing block 7 in the case of no lack of the vertical synchronizing signal pulses. The AND gate 22 has its one input supplied with a vertical synchronizing signal (see FIG. 5 (a)) separated by the OCRVD5, as described above, and the other input supplied with a mask signal as shown in FIG. 5 (b) from the RS-flip-flop 24 for VD mask. The RS-flip-flop 24 for VD mask is set by an output of the OR gate 31 and also reset by a signal (see FIG. 5 (d)) from the OCRV29 having a predetermined set value determining a mask period. Therefore, the mask signal (see FIG. 5 (b)) controls opening/closing of the AND gate 22 such that the gate is closed only during the period of 15 m sec in the NTSC system and of 18 m sec in the PAL system after the vertical timer counter 25 is reset by the vertical synchronizing signal.

An output of the AND gate 22 is supplied to the OR gate 23 via the AND gate 30, and an output of the OR gate 23 (see FIG. 4 (c)) is outputted as the reference signal REF 60 via the AND gate 34. In the case of no lack of the vertical synchronizing signal pulses, the count value of the vertical timer counter 25 does not reach a set value (which is 102% of a vertical period) of the OCRV26, and thus the RS-flip-flop 33 for output forbidding is not set. Therefore, the AND gate 34 is not closed, so that the output of the OR gate 23 (FIG. 5 (c)) is outputted as a reference signal. In this case, an output of the OCRV28 (FIG. 5 (e)) does not function.

Figure 6A:
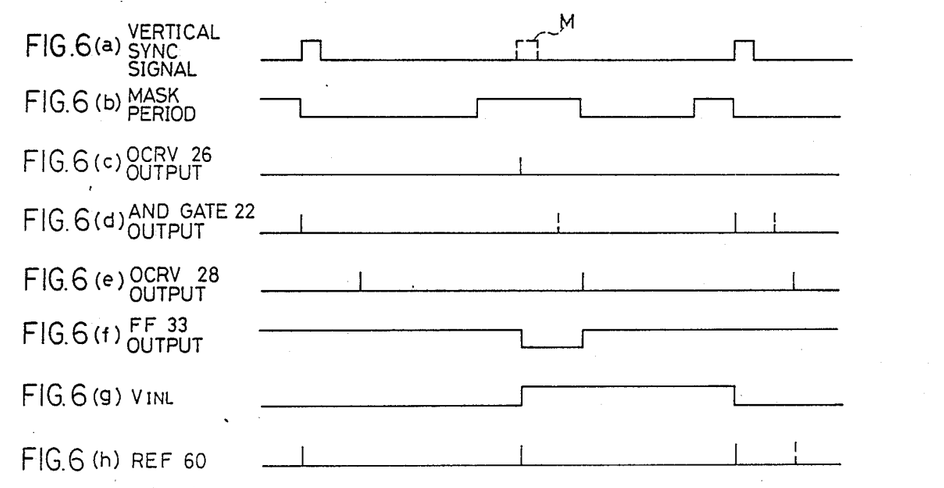

FIG. 6 is a timing chart for illustrating operation of the vertical processing block 7 in the case that lack or delay occurs in the vertical synchronizing signal pulses.

That is, since the vertical timer counter 25 is not reset in the normal vertical synchronizing period in the case that a lack occurs in the vertical synchronizing signal pulse, as shown by the broken line of FIG. 6 (a), an output shown in FIG. 6 (c) is obtained from the OCRV26 having a set value corresponding to 102% of the vertical period. That is, the timing of the output of the OCRV26 is deviated by 2% of the vertical period from the timing of the original vertical synchronizing period. The output of the OCRV26 is supplied as the compensation signal to the OR gate 23, thereby compensating the lack of the output of the AND gate 22. The lack of the vertical synchronizing signal pulse does not cause the RS-flip-flop 24 for VD mask to be set, so that the mask period does not start. Therefore, by setting the RS-flip-flop 24 for VD mask by an output of the OCRV28 (FIG. 6 (e)), the mask period is forced to start. (FIG. 6 (b)).

Furthermore, the output of the OCRV26 sets the RS-flip-flop 32 for VD compensation and the RS-flip-flop 33 for output forbidding. The RS-flip-flop 32 for VD compensation is reset by the output of the AND gate 22, and an output $V_{INL}$ thereof (FIG. 6 (g)) informs the microcomputer that compensating operation is carried out. The RS-flip-flop 33 for output forbidding is reset by the output of the OCRV28, and an output thereof (FIG. 6 (f)) is supplied to the other input of the AND gate 34. Accordingly, the AND gate 34 is closed during a fixed period immediately after the compensating operation is carried out.

In the case that there is no lack of the vertical synchronizing signal pulses, but the vertical period increases temporarily for some reason and then returns to the original period (shown by the broken line of FIG. 6 (d)), the RS-flip-flop 33 and the AND gate 34 forbid outputting which occurs immediately after the compensating operation, as described above, thereby preventing delayed vertical synchronizing signal pulse from being outputted (FIG. 6 (h)) and thus occurrence of an output of an extremely short period.

Figure 7:
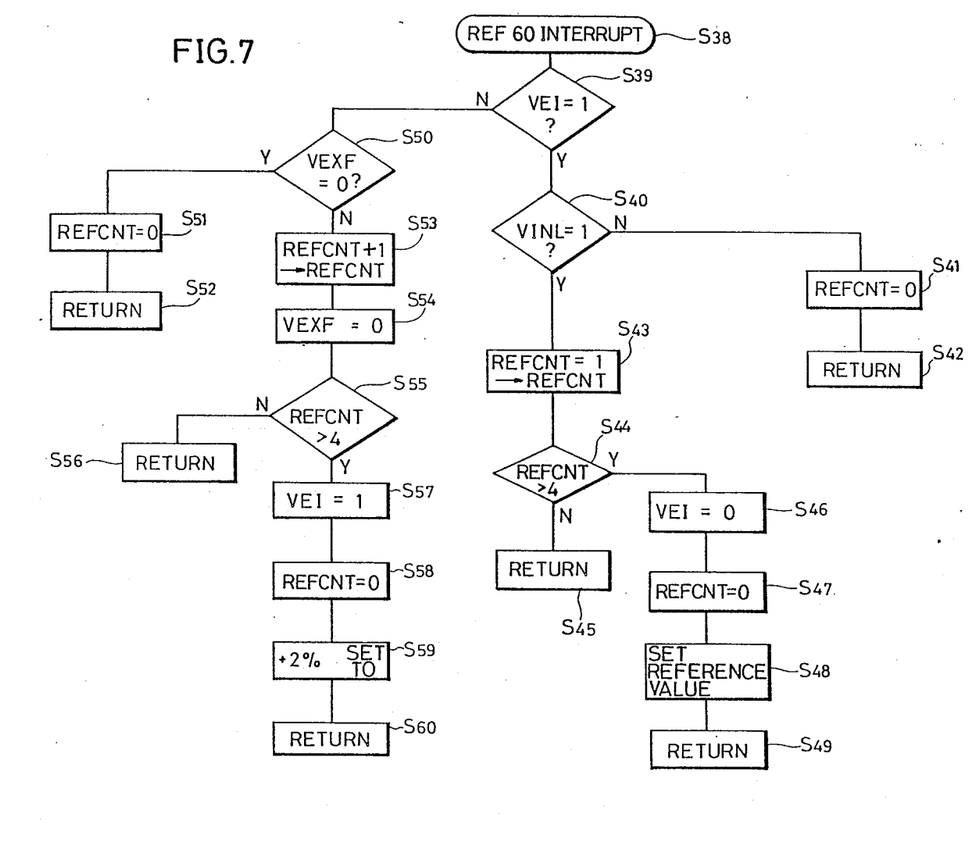
FIG. 7 is a flow chart for illustrating a compensating operation of the embodiment shown in FIG. 2.

In the case that a predetermined number or more of the vertical synchronizing signal pulses lack successively for some reason, the set value of the OCRV26 is automatically varied by the microcomputer. FIG. 7 is a flow chart illustrating an operation of varying this set value.

As shown in FIG. 7, each time the reference signal REF 60 is provided from the AND gate 34, an interrupt operation (step S38) is performed as follows.

First of all, the level of the $V_{EI}$ externally applied is checked (step S39). The $V_{EI}$ here represents a signal which attains the H level in recording in the VTR and the L level in reproduction. When the $V_{EI}$ is at the H level (or "1"), the level of $V_{INL}$ being a Q output of the RS-flip-flop 32 for VD compensation is checked (step S40). If the $V_{INL}$ is at the L level, i.e., if the compensating operation of the vertical synchronizing signal pulses is not carried out, a register REFCNT is reset (step S41) to complete the interrupt operation (step S42).

Meanwhile, since the compensating operation of the vertical synchronizing signal is carried out when the $V_{INL}$ is at the H level, the value of the register REFCNT is incremented by one (step S43), so that it is checked whether or not the value of the REFCNT is larger than 4 (step S44). If the value is not larger than 4, the interrupt operation is completed (step S45).

On the other hand, if the value is larger than 4, the $V_{EI}$ is reset (step S46), and then the REFCNT is reset (step S47). The set value of the OCRV26 is then set to a value equal to that of the vertical synchronizing period (step S48) and then the interrupt operation is completed (step S49).

In addition, when the $V_{EI}$ is at the L level (or "0"), the VEXF which is a Q output of the RS-flip-flop 35 for external VD detection is checked (step S50). If the VEXF is at the L level, the register REFCNT is reset (step S51) since there is no external input, and then the interrupt operation is completed (step S52).

On the other hand, when the VEXF is at the H level, the value of the REFCNT is incremented by one (step S53) to clear the VEXF (step S54) and then check whether or not the value of the REFCNT is larger than 4 (step S55). If the value is not larger than 4, the interrupt operation is completed (step S56).

If the value is larger than 4, the $V_{EI}$ is set (step S57) and the REFCNT is reset (step S58), so that the set value of the OCRV26 is set to be 102% of the vertical synchronizing period (step S59) to complete the interrupt operation (step S60).

Figures 8A, 8B, 8C:
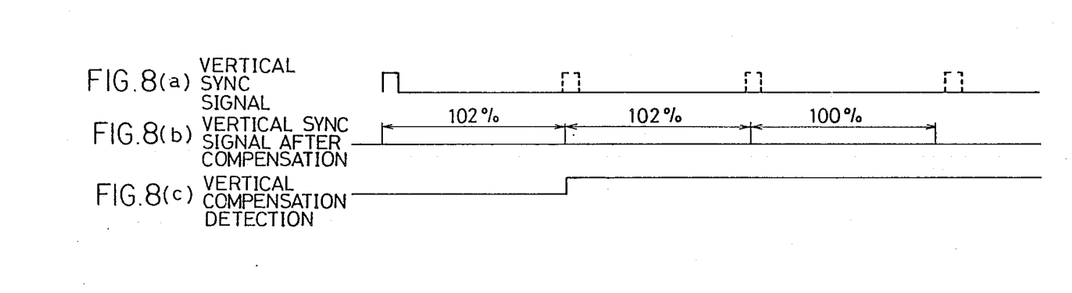
FIG. 8 is a timing chart for illustrating the compensating operation of the embodiment shown in FIG. 2.

Due to the above described interrupt operations, unless four or more of the vertical synchronizing signal pulses are inputted successively when the $V_{EI}=1$, namely, in the state of accepting an external input, an internal reference signal having the normal vertical period is selected to be outputted. Meanwhile, if four of the vertical synchronizing signal pulses are successively inputted externally when the $V_{EI}=0$, namely, in the state of employing an internal reference signal, the external input is selected to be outputted. A timing chart of FIG. 8 illustrating the above described operations, shows the case that a change to the internal reference signal is available with the lack of two or more of the vertical synchronizing signal pulses, for brief description thereof.

Meanwhile, a similar operation is performed with respect to the horizontal synchronizing signal. Namely, in the case that a predetermined number or more of the horizontal synchronizing signal pulses lack successively for some reason, the set value of OCRH14 is automatically varied by the microcomputer to correspond to the normal horizontal period.

Decision of the PAL/NTSC by the PAL/NTSC decision block 8 is carried out based on the number of the H signal pulses to be counted before the counter 20 is reset by the output of the OCRVD5. That is, 312.5 of and 262.5 of the H signal pulses should be counted in the PAL and NTSC systems, respectively, because of a difference in number of scanning lines between these two systems. Therefore, a threshold value of the OCR21 is set to 288, so that an output thereof decides the PAL/NTSC. The result of this decision makes the set values of the respective OCRs varied.

Figure 9A:
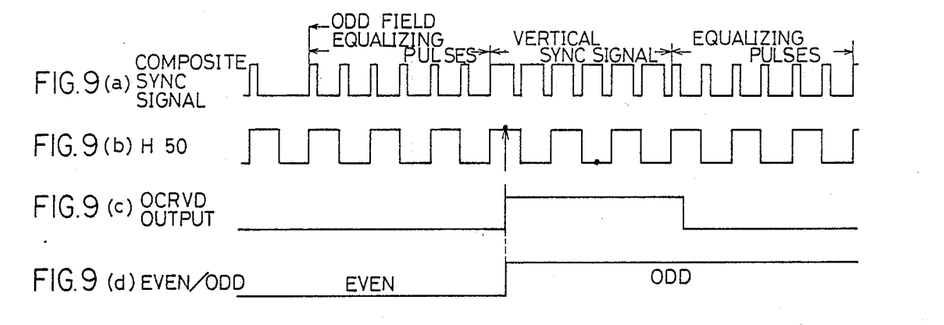
FIGS. 9 and 10 are timing charts for illustrating an even/odd number field deciding operation in the embodiment shown in FIG. 2.
Figure 10A:
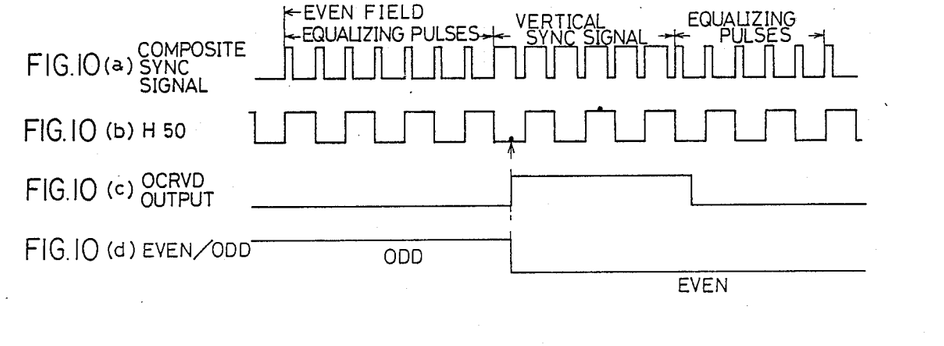

Furthermore, the even/odd number field decision block 9 carries out the decision of the even/odd number fields based on the level of the H50 signal (b) in rising of the output of the OCRVD5 (FIG. 9 (c) and FIG. 10 (c)), i.e., based on a difference in phase relationship between the H 50 signal and the vertical horizontal signal, as shown in FIGS. 9 and 10. For example, as shown in FIG. 9, if the H50 signal (b) is at the H level in rising of the output (c) of the OCRVD5, the block 9 decides on the odd number field (d). Meanwhile, as shown in FIG. 10, if the H50 signal (b) is at the L level in rising of the output (c) of the OCRVD5, the block 9 decides on the even number field (d). A delay due to the OCRV27 is not inherent processing but for synchronizing the timing of other processing with each other.

Next, a description will be given on the reference signal producing circuit according to the second embodiment of the present invention with reference to FIGS. 11 and 12. The second embodiment is the one to solve the following problems which occur in the horizontal processing block of the above described first embodiment.

That is, in the synchronization separator circuit in FIG. 2, when the original horizontal synchronizing signal pulse is inputted immediately after compensation of the horizontal synchronizing signal pulse by the OCRH14 (FIG. 12 (a)), for example, in changing the channel, the *H signals are successively outputted in an extremely short period (d). Further, when the lack of the horizontal synchronizing signal pulse is compensated, masking of the HD signal is not carried out in the configuration of FIG. 2 (FIG. 12 (b)). Therefore, noise is liable to be regarded as the horizontal synchronizing signal pulses.

Figure 11:
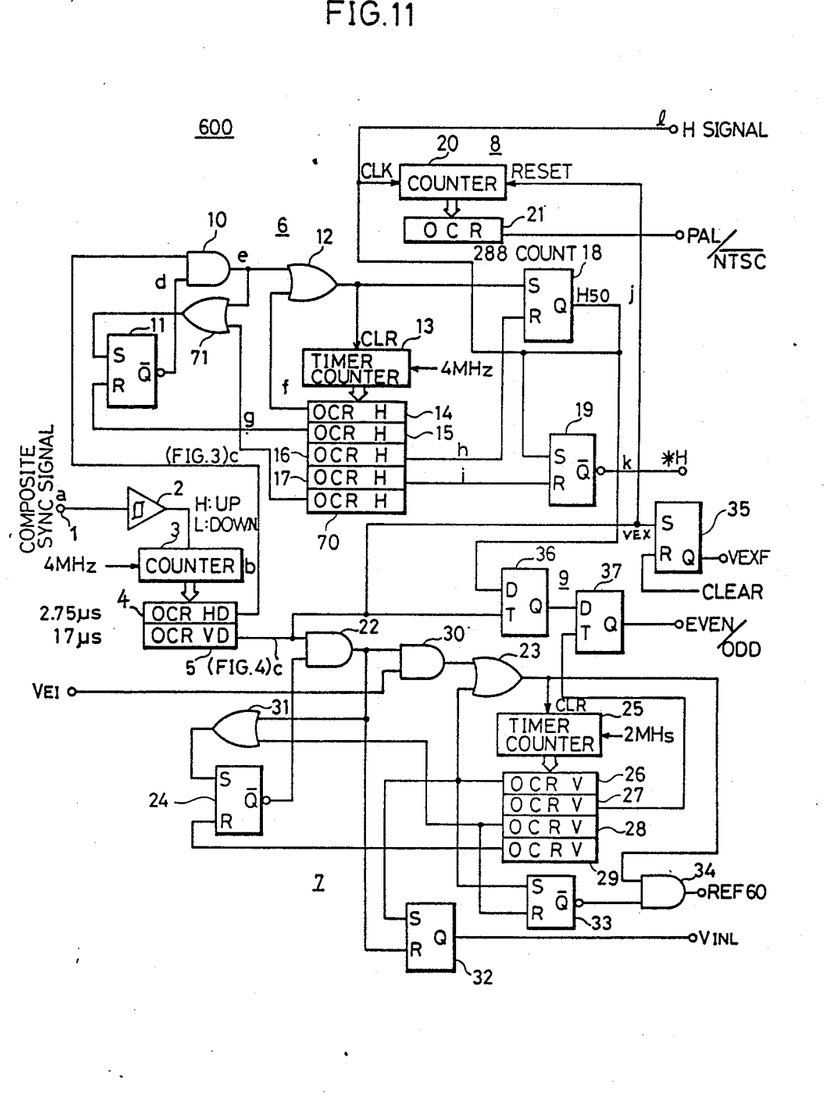
FIG. 11 is a block diagram illustrating a reference signal producing circuit according to another embodiment of the present invention.
Figure 12A:
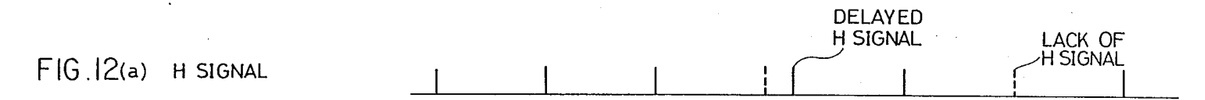
FIG. 12 is a timing chart for illustrating the operation of the horizontal processing block in the reference signal producing circuit shown in FIG. 11.
Figure 12B:
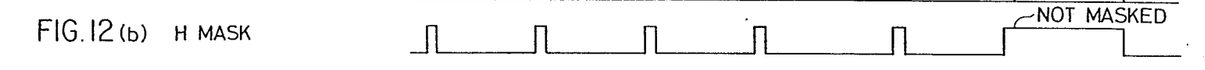
Figure 12C:
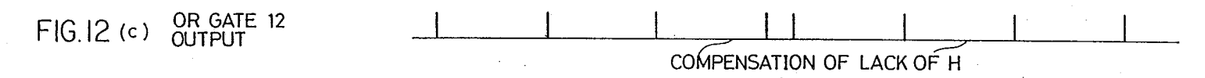
Figure 12D:
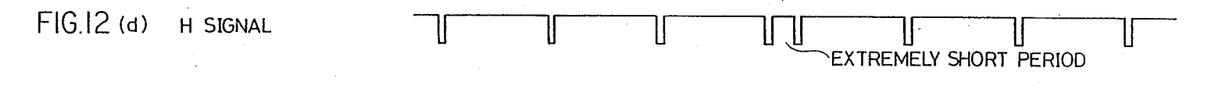
Figure 12E:
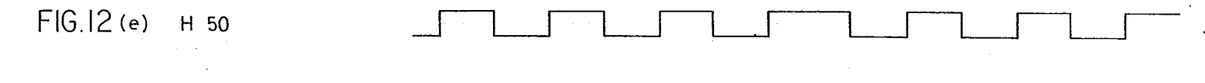
Figures 12F, 12G:
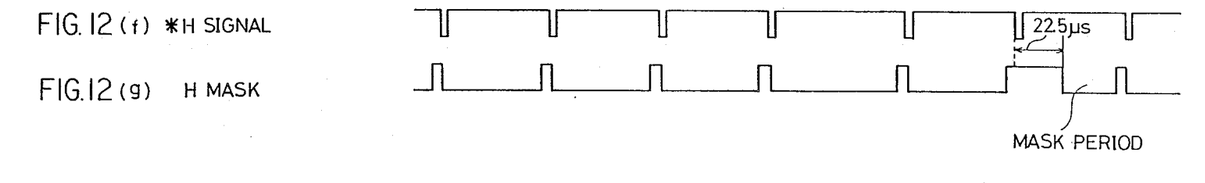

In consideration of the foregoing problems, the embodiment of FIG. 11 is configured such that the RS-flip-flop 19 for *H output is set by a Q output of the RS-flip-flop 18 for H50 output, and also the H50 signal is employed as a clock signal of the PAL/NTSC decision block 8. The employment of this stable H50 signal keeps both the state of the RS-flip-flop 18 for H50 output and thus the *H signal unchanged, even if the original horizontal synchronizing signal pulse is inputted immediately after compensation of the lack of the horizontal synchronizing signal pulse. Thus, the PAL/NTSC decision can also be carried out more accurately.

Moreover, the embodiment of FIG. 11 is further configured such that an OCRH70 is separately provided having a set value corresponding to 25.5 $\mu$ sec, and the RS-flip-flop 11 for HD mask is set by an output of the OCRH70 or that of the AND gate 10. Accordingly, the AND gate 10 is masked (FIG. 12 (g)) when 25.5 $\mu$ sec have passed after compensation of the lack of the horizontal synchronizing signal pulse, so that noise is less liable to be regarded as the horizontal synchronizing signal pulse.

As has been described, according to the embodiments of the present invention, the stable phase servo control can be carried out by making equal the period of the compensation signal to the vertical synchronizing period, in the case that the plurality of vertical synchronizing signal pulses lack successively. Furthermore, even in the case that the plurality of the horizontal synchronizing signal pulses lack, the occurrence of the V jitter in special reproducing can be prevented by compensation of this lack.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A reference signal producing circuit for producing a reference signal based on a composite synchronizing signal externally supplied, comprising:
   means (3, 5) for separating a synchronizing signal from said composite synchronizing signal;
   first timer means (25) reset by said reference signal;
   first compensation signal producing means (26) for comparing an output of said first timer means with a variable set value and producing a first compensation signal having a variable period;
   reference signal output means (23) for supplying as said reference signal an output of said synchronizing signal separating means or an output of said first compensation signal producing means; and
   means for changing said set value of said first compensation signal producing means such that the period of said first compensation signal is normally set to a value larger than the value of a synchronizing signal period while being set to a value equal to the synchronizing signal period in the case that a predetermined number of or more of the synchronizing signal pulses within said composite synchronizing signal lack successively.

2. A reference signal producing circuit according to claim 1, wherein said synchronizing signal separated from said composite synchronizing signal is a vertical synchronizing signal.

3. A reference signal producing circuit according to claim 2, further comprising:
first mask means (22, 24) for preventing said separated vertical synchronizing signal from being inputted to said reference signal output means.

4. A reference signal producing circuit according to claim 3, wherein
said first mask means comprises
means (24) for generating a signal for defining a mask period, and
means (22) responsive to said mask signal for preventing passing of said vertical synchronizing signal.

5. A reference signal producing circuit according to claim 2, further comprising:
means (33, 34) for preventing said reference signal from being outputted from said reference signal output means during a predetermined period after production of said first compensation signal.

6. A reference signal producing circuit according to claim 2, further comprising:
means (32) for indicating that the first compensation signal is produced by said first compensation signal producing means.

7. A reference signal producing circuit according to claim 2, further comprising:
means (30) responsive to an external input for preventing said separated vertical synchronizing signal from being inputted to said reference signal output means.

8. A reference signal producing circuit according to claim 2, further comprising:
means (6) for producing a reference horizontal synchronizing signal based on said composite synchronizing signal.

9. A reference signal producing circuit according to claim 8, wherein
said reference horizontal synchronizing signal producing means comprises
means (3, 4) for separating a horizontal synchronizing signal from said composite synchronizing signal,
second timer means (13) reset by reset pulses,
second compensation signal producing means (14) for comparing an output of said second timer means with a predetermined set value and producing second compensation signal having a period longer than a normal horizontal synchronizing signal period, and
reset pulse output means (12) for supplying as said reset pulses an output of said horizontal synchronizing signal separating means or an output of said second compensation signal producing means.

10. A reference signal producing circuit according to claim 9, further comprising:
mask means (10, 11) for forbidding said separated horizontal synchronizing signal to be inputted to said reset pulse output means.

11. A reference signal producing circuit according to claim 10, wherein
said second mask means comprises
means (11) for generating a signal for defining a mask period, and
means (10) responsive to said mask signal for preventing passing of said horizontal synchronizing signal.

12. A reference signal producing circuit according to claim 9, wherein
an output of said reset pulse output means is supplied as said reference horizontal synchronizing signal.

13. A reference signal producing circuit according to claim 9, wherein
said reference horizontal synchronizing signal producing means further comprises
means (18) for generating a reference horizontal synchronizing signal of 50% duty being in synchronization with the output of said reset pulse output means.

14. A reference signal producing circuit according to claim 12, further comprising:
means (8) for deciding a system of video signal pulses by counting the number of said reference horizontal synchronizing signal pulses within one period of said vertical synchronizing signal.

15. A reference signal producing circuit according to claim 13, further comprising:
means (8) for deciding a system of video signals by counting the number of said reference horizontal synchronizing signal pulses within one period of said vertical synchronizing signal.

16. A reference signal producing circuit according to claim 13, further comprising:
means (9) for deciding on an even number field or an odd number field by detecting the level of said reference horizontal synchronizing signal of 50% duty at timing of said reference signal.

* * * * *